United States Patent [19]

Moore

[11] Patent Number: 4,698,454
[45] Date of Patent: Oct. 6, 1987

[54] LIGHTWEIGHT THERMOCOUPLE ASSEMBLY

[75] Inventor: M. Samuel Moore, Northridge, Calif.

[73] Assignee: Semco Instruments, Inc., North Hollywood, Calif.

[21] Appl. No.: 646,822

[22] Filed: Sep. 4, 1984

[51] Int. Cl.$^4$ ............................................. H01L 35/02
[52] U.S. Cl. ..................................... 136/233; 136/230; 136/232
[58] Field of Search .............................. 136/230–235, 136/228; 374/179

[56] References Cited

U.S. PATENT DOCUMENTS

| | | | |
|---|---|---|---|
| 3,290,178 | 12/1966 | Loveland | 136/230 |
| 3,376,169 | 4/1968 | Davis et al. | 136/230 |
| 3,765,242 | 10/1973 | Bailleu | 136/230 |
| 3,811,958 | 5/1974 | Maurer | 136/230 |
| 3,913,058 | 10/1975 | Nishio et al. | 136/230 |
| 4,018,624 | 4/1977 | Rizzolo | 136/230 |
| 4,088,509 | 5/1978 | Blaze, Jr. | 136/230 |
| 4,162,929 | 7/1979 | Finney | 136/230 |

Primary Examiner—Deborah L. Kyle
Assistant Examiner—T. J. Wallen
Attorney, Agent, or Firm—Poms, Smith, Lande & Rose

[57] ABSTRACT

A thermocouple system has been nicknamed the "Binocular" thermocouple assembly because the terminal housing has a configuration similar to a pair of binoculars, with the chromel and alumel terminals mounted in spaced circular openings in the terminal housing. A thermocouple probe extends outwardly from the terminal housing, and is provided with two peripheral grooves, into one of which the terminal housing is secured by swaging. The second groove in the thermocouple probe is spaced away from the terminal housing by a short distance along the probe, and a washer is securely swaged into this second groove. A nut having external threads is mounted between the terminal housing and the washer for securing the thermocouple probe to its sensing location, for example, mounted adjacent a turbine engine. The probe has a relatively thick outer wall for most of its length for high strength under adverse mechanical and temperature conditions, and has a relatively thin wall near its end, for fast response to temperature changes, with the two sections being interconnected by a tapered transition section. The thermocouple wires are insulated from the inner walls of the probe by compressing high temperature particulate material; and similarly, the terminals are mounted within the openings in the terminal housing by fuse bonded ceramic or refractory materials and glasses which bond to both the stainless steel terminal housing and also to the chromel and alumel terminals.

14 Claims, 4 Drawing Figures

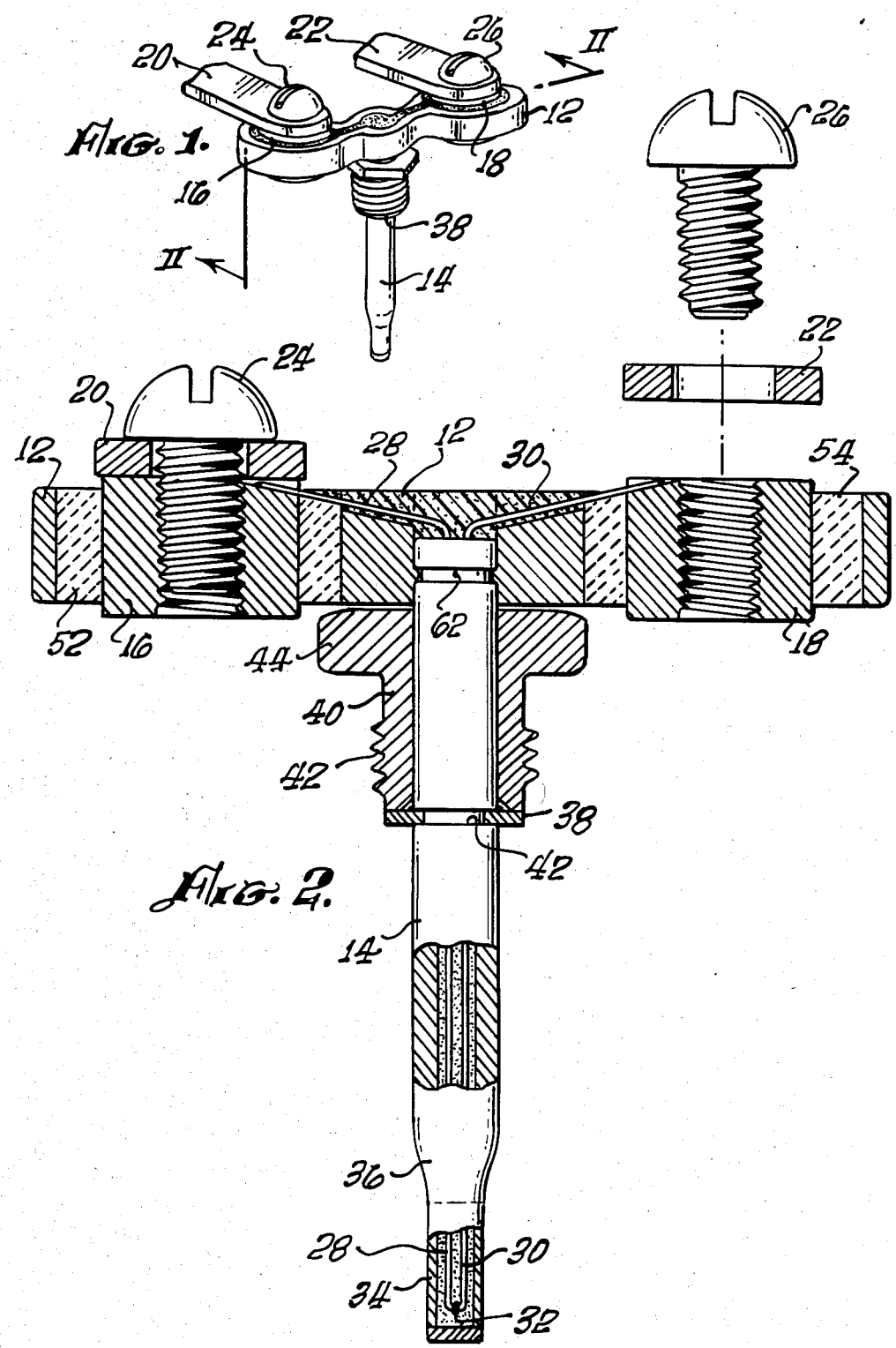

LIGHTWEIGHT THERMOCOUPLE ASSEMBLY

FIELD OF THE INVENTION

The present invention relates to high temperature thermocouple assemblies.

BACKGROUND OF THE INVENTION

In the field of high temperature sensing, it is well known to use dissimilar metals or alloys which have a junction located close to the point where the temperature is to be sensed. The high temperature produces a thermoelectric potential at the junction between the two dissimilar metals and this thermoelectric voltage may be sensed, amplified, and employed as an indication of the temperature being sensed, in view of the increase in the thermoelectric effect with increased temperature. Two well known alloys which are used in high temperature thermocouples are chromel and alumel. In practice it is desirable that the entire circuit extending from the sensing junction back to the relatively cooler point where the electronics are located be formed of the same two thermocouple materials, chromel and alumel; and this would include the thermocouple wires themselves, the terminal at each thermocouple junction, and the heavy electrical conductors or busses which extend back to the electronic circuit. Then, within the electronic circuitry, conventional "cold junction temperature compensation" circuitry is employed, and the thermoelectric current or voltage is accurately calibrated to indicate the temperature at the thermocouple junction. A number of different forms of thermocouple housing assemblies have been proposed heretofore, and one such arrangement is disclosed in U.S. Pat. No. 4,460,225, assigned to the assignee of the present invention, and other known arrangements are shown in the patents cited in that issued patent.

Many thermocouples which have been proposed heretofore have been relatively heavy and massive, and therefore have not been suitable for certain applications where weight is an important factor. In addition, certain prior thermocouples have not been as rugged, or have as fast a response as might be desirable. Other thermocouples have been limited in the temperatures to which they may be reliably employed.

Accordingly, objects of the present invention include (1) a reduction in the weight of thermocouple assemblies; (2) providing increased ruggedness at high temperatures; (3) increasng the speed of response of thermocouples without significantly decreasing their mechanical strength, and (4) simplifying assembly of thermocouple units, by eliminating the brazing or welding steps which have been used heretofore.

SUMMARY OF THE INVENTION

In accordance with one aspect of the invention, a thermocouple assembly includes a thermocouple probe having two peripheral grooves, and a thermocouple terminal housing having an overall "binocular" type of configuration, with two outer openings for receiving the thermocouple terminals, and a small central opening for receiving the thermocouple probe, and with the sidewalls of the central portion of the terminal housing being mechanically deformed or swaged into a groove adjacent the base of the thermocouple probe.

Other features of the invention include the following:

1. A second groove may be provided in the thermocouple probe, and a washer may be swaged into this second groove. A nut having external threads may be mounted on the thermocouple probe between the terminal housing and the washer, for securing the thermocouple probe in its desired final position adjacent the area where the temperature is to be sensed.
2. The terminals may be mounted within the two outer openings of the terminal housing, by fuse bonding using high temperature refractory materials, glasses, and fluxes, to seal, mount and insulate the terminals within the openings in the terminal housing.
3. The thermocouple probe may have a relatively constant diameter central opening for receiving the thermocouple wires, with the outer diameter of the thermocouple probe being relatively large for most of the length thereof, but with the outer end of the probe having a much smaller diameter, and the two sections of the probe being interconnected by a short tapered section. With this arrangement, the base portion of the probe has high strength and good thermal conductive characteristics for ruggedness in adverse temperature and mechanical conditions, and the outer end of the probe is thin walled so that the thermocouple junction has a fast response time.

Additional advantages of the new construction include the fact that no welding or brazing is required as a manufacturing operation to secure the probe to the terminal assembly, and the unit is extremely lightweight, in view of the minimum material required in the "binocular" terminal housing.

Other objects, features and advantages of the invention will become apparent from a consideration of the following detailed description, and from the accompanyng drawings.

BRIEF DESCRIPTION OF THE DRAWINGS

FIG. 1 is a isometric view of a thermocouple probe illustrating the principles of the present invention;

FIG. 2 is a partial cross-sectional view taken along lines II—II of FIG. 1;

DETAILED DESCRIPTION

Figure 3:
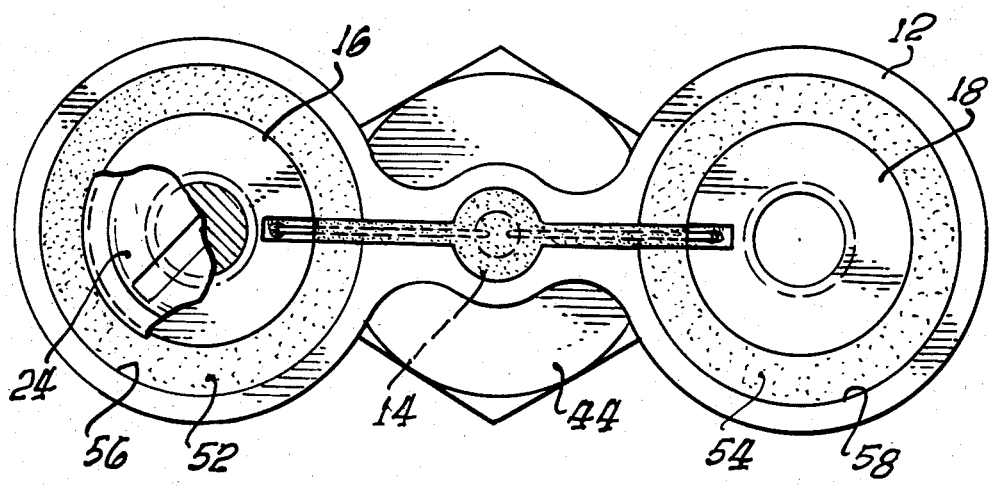
FIG. 3 is a partially broken away top view of the thermocouple assembly of FIG. 1.

Referring more particularly to the drawings, FIG. 1 shows a thermocouple assembly illustrating the principles of the invention, including a terminal housing 12 and the thermocouple probe 14. Also shown in FIG. 1, and perhaps to better advantage in the cross-sectional view of FIG. 2 are the terminals 16 and 18 which may be made of chromel and alumel, respectively. A number of thermocouples are often connected in parallel, and this is often accomplished through the use of connectors such as the buses 20 and 22 secured to the terminals 16 and 18 by the screws 24 and 26, respectively. For the reasons mentioned above in the background of the Invention Section of this specification, the bus 20 which is in electrical contact with the contact 16 is made of the same thermocouple alloy as the terminal 16 and the associated wire 28 forming part of the thermocouple pair of wires. Similarly, the bus 22 is of the same material as the terminal 18 and the other thermocouple wire 30. As mentioned above, these two materials may, for example, be chromel and alumel, and they are connected together at the point 32 near the end 34 of the thermocouple probe 14.

The configuration of the thermocouple probe 14 is designed to combine high strength and ruggedness, with fast response time of the thermocouple to changes in temperature. This is accomplished by using a thermocouple probe 14 which has relatively thick walls from its base up to the tapered section 36 by which it is coupled to the thin walled end section 34. Thus, by way of example but not of limitation, the opening through the entire length of the probe 14 may be in the order of 0.060 inch in diameter; and the wall thickness in the thicker portion of the probe from the base down to the tapered section 36, may be in the order of 0.044 inch, making an outer diameter for the main portion of the probe of approximately 0.148 inch. The tip 34 of the probe may have a wall thickness in the order of 0.016 or 0.017 inch, giving an outer diameter for this portion of the probe in the order of 0.092 or 0.094 inch. With the wall thickness at the tip of the probe being less than one half of the wall thickness for the base portion of the probe, a combination of rapid response time of the thermocouple, together with ruggedness in the presence of high temperatures and mechanical vibration, is achieved. Incidentally, while dimensions are being set forth to give an example, the overall length of the thermocouple probe 14 may be in the order of 1.5 inches, and the tapered portion 36 starts at a distance of approximately ¼ or ⅜ths of an inch from the end of the probe.

In order to mount the thermocouple assembly in the desired location, a washer 38 and a nut 40 are provided. The washer 38 is mechanically deformed or swaged into a groove 42 which is along the length of the thermocouple probe 14, close to the thermocouple terminal housing 12 than to the outer end 34 of the thermocouple probe. The nut 40 is mounted for rotation about the probe 14, with its external threads 42 engaging the mating threads on a mount adjacent the zone in which the temperature is to be measured. The head 44 of the nut 40 is provided with the usual hexagonal flanges for engagement by a wrench.

FIG. 3 shows a top view of the thermocouple assembly, showing the terminal housing 12, the base of the probe 14, and the head 44 of the nut. Also visible in FIG. 3 are the high temperature insulating rings 52 and 54 which are fuse-bonded to the inner walls 56 and 58 of the terminal housing openings, to mount the terminal 16 and 18 in place.

Figure 4:
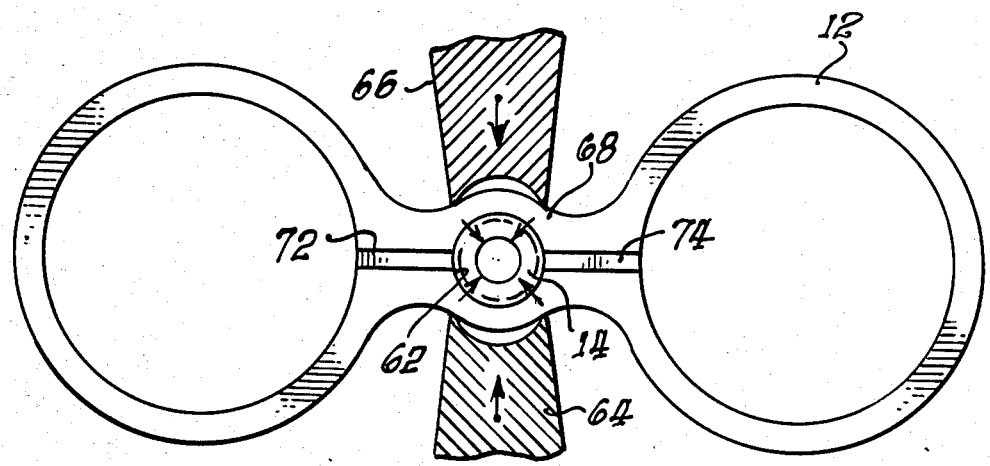
FIG. 4 is a diagrammatic showing of the "binocular" terminal housing indicating the step of swaging the terminal housing onto the thermocouple probe.

FIG. 4 shows the method involved in securing the terminal housing 12 to the thermocouple probe 14. Thus, as shown in FIG. 2, the thermocouple probe has a second groove 62 near its larger end. Using a pair of tools such as the tools shown at 64 and 66 in FIG. 4, material from the central portion 68 of the terminal housing 12, is swaged into the groove 62, shown in dashed lines in FIG. 4. The grooves 72 and 74 provide clearance for the thermocouple wires as they are brought out of the thermocouple probe to engage the electrical terminals.

For completeness, it may be noted that the thermocouple wires 28 and 30, which are made of chromel and alumel, are embedded in compressed and bonded particulate material with densities ranging in the 90% to 94% range of a ceramic nature, such that they will withstand high temperatures and provide appropriate insulation. This type of thermocouple wire, including pairs of wires embedded in extended lengths of compressed particulate ceramic material is available from Semco Instruments, Inc. at 11505 Vanowen Street, No. Hollywood, Calif. 91605, and such lengths of thermocouple wire may be cut off to the desired length, with a portion of the insulating material being stripped away, for making the junction 32 and for connecting the other ends of the chromel and alumel wires to the terminals 16 and 18.

Concerning the rings of high temperature insulating material 52 and 54, these may be of any desired material, depending on the temperature level to which the thermocouple assembly will be subjected. In general, ceramic and high temperature glass materials are sintered, pulverized, and then melted together in place to form the rings 52 which are fuse-bonded to both the terminal housing 12 and to the chromel and alumel terminals 16 and 18. One type of lower temperature glass which could be employed, is available from Corning as Type 90-10. More generally, high temperatue glasses, fluxes, and refractory materials are the ingredients for the rings 52 and 54. Concerning another aspect of the construction, certain dimensions of the probe 14 were set forth hereinabove and certain representative dimensions for the terminal housing will now be noted by way of example. More specifically, the spacing between the centers of the two "binocular" openings may be about ½ inch and the inner diameter of these two openings may be approximately ¼ inch, plus or minus 5 thousandths of an inch; with the outer diameter being approximately 0.625 inch. This gives a thickness for the walls of approximately 0.062 inch, and this same approximate wall thickness is present in the central area 68 of the terminal assembly 12.

It is this relative thinness of the walls which permits the swaging operation discussed hereinabove, and described in conjunction with FIG. 4 of the drawings.

In conclusion, it is to be understood that the foregoing detailed description and the accompanying drawings disclose one illustrative preferred embodiment of the invention. Various changes may be made without departing from the spirit and scope of the invention. Thus, by way of example, and not of limitation, the dimensions given for the probe are merely representative, and somewhat larger or smaller thermocouple assemblies may, of course, be constructed, depending on the desired application. In addition, instead of using circular terminals and openings, other geometries such as square or polyhedral terminals could be employed, and the exact form of the connection from the probe to the terminals could, of course, be modified. Accordingly, the present invention is not limited to that precisely as shown in the drawings, and described in detail hereinabove.

What is claimed is:

1. A thermocouple system comprising:
a thermocouple probe comprising an elongated, generally cylindrical probe housing having a base an outer wall and a closed outer end, a passageway extending from the base to a point near the end of said housing, the wall thickness of said probe housing from the base to a point near the outer end being relatively thick for increased strength, the wall thickness of said probe housing at and near the end of said housing being relatively thin, substantially equal to one-half or less than one-half of the thickness of the relatively thick wall, for rapid thermocouple response, and the outer wall of said thermocouple probe housing being tampered near the outer end thereof;

a pair of thermocouple wires of dissimilar metals mounted within and insulated from said housing, and extending to the outer end of said housing where they are joined to one-another;

said probe housing having two peripheral grooves, a first one immediately adjacent the base of said housing and a second groove spaced away from said base;

a terminal assembly swaged into said first groove, said terminal assembly including first and second spaced terminals;

said terminal assembly having a generally binocular exterior configuration with first and second spaced openings enclosing said first and second terminals, respectively, and each opening being substantially centered within and enclosed by a thin wall forming part of a terminal housing;

high temperature insulating means mounting said terminals in respective spaced openings in said terminal assembly;

said high temperature insulating means being fuse-bonded both to said terminals and to said walls of the terminal housing;

a washer swaged into said second groove;

threaded nut means rotatably mounted on said probe housing between said terminal assembly and said washer for mounting said assembly to a location where the temperature is to be measured; and means for connecting said thermocouple wires to said respective terminals.

2. A thermocouple system as defined in claim 1 wherein said high temperature insulating means is a fused body of high temperature glass and ceramic material bonded to both said terminal housing and to said terminals.

3. A thermocouple system as defined in claim 1 wherein said passageway has a substantially constant diameter, and wherein the outer diameter of said probe at the outer end thereof is substantially less than that at the base thereof.

4. A lightweight thermocouple assembly comprising:
a terminal housing having a substantially binocular configuration, with two spaced large openings, each substantially centered on one part of the binocular terminal housing, and one small central opening having a diameter less than one-half the diameter of said large openings;
a thermocouple probe having a first end mounted in said central opening and a second end extending outwardly from said housing;
first and second thermocouple terminals;
means for fuse bonding said terminals into said large openings in said housing with high temperature insulating material;
the fuse bonding forming the principal mechanical structure interconnecting said terminals and said housing; and
first and second thermocouple wires of respectively different thermocouple materials extending from each of said terminals into engagement with one another to form a sensing junction adjacent said second end of said probe.

5. A lightweight thermocouple assembly as defined in claim 4 wherein said probe has a peripheral groove adjacent a base end thereof, and wherein said terminal housing is swaged into said groove.

6. A lightweight thermocouple assembly as defined in claim 4 wherein said probe has a peripheral groove at a point along its length spaced away from said terminal housing, a washer is swaged into said groove, and threaded nut means rotatably held between said terminal housing and said washer, is provided for mounting said entire assembly in the desired location for sensing elevated temperatures.

7. A thermocouple system as defined in claim 4 wherein said high temperature insulating means is a fused body of high temperature glass and ceramic material bonded to both said terminal housing and to said terminals.

8. A thermocouple system as defined in claim 4 wherein said passageway has a substantially constant diameter, and wherein the outer diameter of said probe at the outer end thereof is substantially less than that at the base thereof.

9. A thermocouple system comprising:
a thermocouple probe comprising an elongated, generally cylindrical probe housing having a base and a closed outer end, a passageway extending from the base to a point near the end of said housing, a wall thickness of said probe housing from the base to a point near the outer end being relatively thick for increased strength, and the wall thickness of said housing at and near the end of said housing being relatively thin, substantially equal to one-half or less than one-half of the thickness of the relatively thick wall, for rapid thermocouple response;
a pair of thermocouple wires of dissimilar metals mounted within and insulated from said housing, and extending to the outer end of said housing where they are joined to one-another;
said probe housing having a peripheral groove immediately adjacent the end of the base of said housing;
a terminal assembly swaged into said groove, said terminal assembly including a pair of spaced terminals;
fused high temperature insulating means mounting said terminals in respective spaced openings in said terminal assembly;
said insulating means being bonded to a terminal housing and to said terminals;
threaded nut means rotatably mounted on said probe housing for mounting said assembly to a location where the temperature is to be measured; and
means for connecting said thermocouple wires to said respective terminals.

10. A thermocouple system as defined in claim 9 wherein said terminal assembly includes said terminal housing having a generally binocular configuration with said two spaced openings each enclosed by a thin wall forming part of said terminal housing.

11. A thermocouple system as defined in claim 9 wherein said high temperature insulating means is a fused body of high temperature glass and ceramic material.

12. A thermocouple system as defined in claim 9 wherein said probe housing is provided with a second peripheral groove, and washer means are swaged into said groove for retaining said nut means on said probe housing.

13. A thermocouple system as defined in claim 9 wherein said passageway has a substantially constant diameter, and wherein the outer diameter of said probe at the outer end thereof is substantially less than that at the base thereof.

14. A thermocouple system as defined in claim 9 wherein electrical connector means are coupled to each of said terminals, and wherein each terminal and associated electrical connector means is formed of the same thermocouple alloy as the thermocouple wire to which they are connected.

* * * * *